No. 12,195. REISSUED JAN. 26, 1904.

C. P. ELIESON & V. DE BOBINSKY.

ELECTRICAL ACCUMULATOR.

APPLICATION FILED OCT. 26, 1903.

WITNESSES:

J. A. Van Wart

A. Henderson.

INVENTORS:

Charles P. Elieson

Vladimir de Bobinsky

BY Carl Benjamin their ATTORNEY

No. 12,195. Reissued January 26, 1904.

UNITED STATES PATENT OFFICE.

CHAIMSONOVITZ PROSPER ELIESON AND VLADIMIR DE BOBINSKY, OF PARIS, FRANCE.

ELECTRICAL ACCUMULATOR.

SPECIFICATION forming part of Reissued Letters Patent No. 12,195, dated January 26, 1904.

Original No. 692,433, dated February 4, 1902. Application for reissue filed October 26, 1903. Serial No. 178,641.

*To all whom it may concern:*

Be it known that we, CHAIMSONOVITZ PROSPER ELIESON and VLADIMIR DE BOBINSKY, subjects of the King of Great Britain, and residents of Paris, France, have invented certain new and useful Improvements in Electrical Accumulators, of which the following is a specification.

Our invention relates to electrical accumulators comprising very thin bands or strips of lead, which are alternately corrugated and straight and form very clear and regular spaces. The mounting of the accumulator allows the said strips to expand in a transverse direction laterally, because on the edges there is no mounting uniting the said strips of lead together. These strips, which constitute the active surface of the accumulator, are united together by a central core of lead, which constitutes a kind of backbone, from each side of which extend the thin strips of lead, or, again, this accumulator may be said to be similar in appearance to a bird's feather, the shaft of which constitutes the central conductor and the lead strips resembling the vanes of the feather. A plate of our accumulator is reduced to what we have just explained; but in order that it may not get out of shape and that it shall possess sufficient strength when handled we strengthen it with a frame, which is, however, completely insulated and which in no way involves the employment of metal. At the top and bottom we arrange cross-pieces of wood, ebonite, or other insulating material, and on the side we arrange small strips of wood, ebonite, or other like material. Pieces of india-rubber placed on the said bands and embracing the upper and lower cross-pieces give sufficient strength to the whole and serve at the same time to separate the plates. In this manner with a very little weight we construct an accumulator of great electrical capacity, which will not get out of shape, because the small strips of lead, which constitute the active elements, extend from a central conductor and can freely expand. Moreover, our accumulator-plate is clearly distinguished from plates of known construction by the absence of all metallic covering-frames.

Having thus explained the principle of our accumulator, we will describe by way of example a practical way of carrying out our invention with reference to the accompanying drawings.

Figure 1:
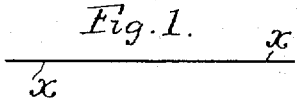
Figure 3:
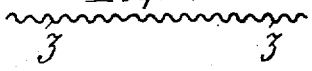
Figure 2:
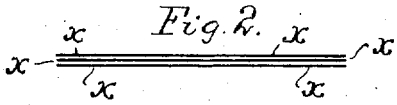
Figure 4:
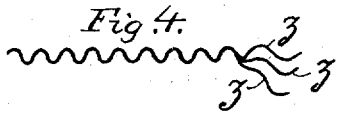
Figure 5:
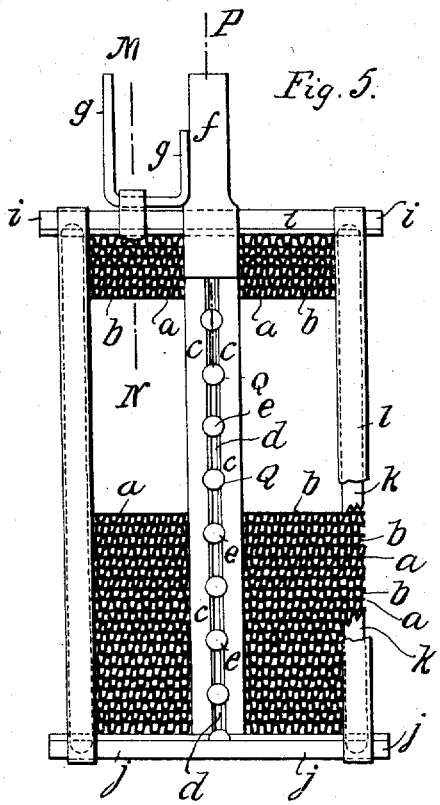
Figure 6:
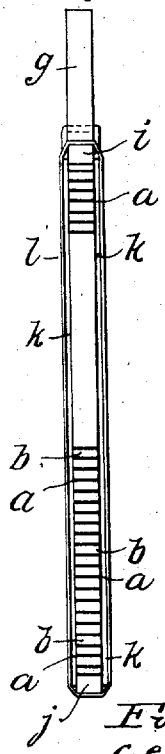
Figure 8:
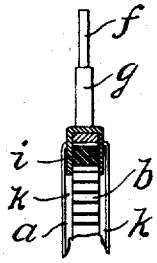
Figure 9:
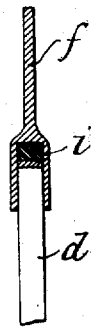
Figure 7:
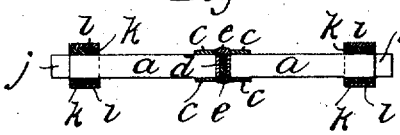
Figure 10:
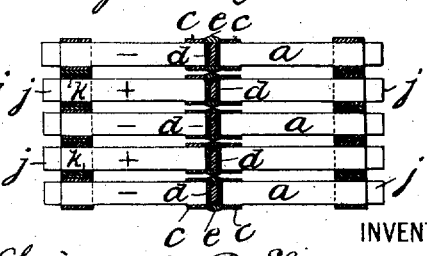

Figure 1 represents a plain strip *x*. Two (or preferably three) of them are generally placed upon one another, as shown in Fig. 2. Fig. 3 represents a corrugated strip *z*, and Fig. 4 shows, on a smaller scale, a band formed of several corrugated strips. Fig. 5 is a front elevation of an accumulator-plate formed with superposed strips. In this figure a part is broken away in order to show the strips on the side. Fig. 6 is a side elevation. Fig. 7 is a horizontal section. Fig. 8 is a section on the line M N, Fig. 5; and Fig. 9 is a section on the line P Q. Fig. 10 is a horizontal section showing several juxtaposed plates, the accumulator comprising two positive plates interposed between three negative plates.

Each accumulator-plate is constructed of two columns composed of a certain number of lead strips *a* and *b* and which are alternately corrugated and flat. These lead strips *a b* are free at their outer sides; but at approximately the middle of the plate they are united together by lead strips *c*, connected by solder with the ends of the strips *a* and *b*. The two columns are placed almost side by side, the two supports *c c* receiving between them a strip of lead *d*. With grains of solder *e* the said lead strip *d* is united to ribs *c c* of the two columns. As shown, the accumulator-plate is provided at the middle in the direction of its length with a compound strengthening-rib comprising the united strips *c* and *d*, on each side of which extend small lead strips *a* and *b*, designed to constitute the active surfaces of the accumulator. The middle rib thus formed extends upward in the form of a lead stem *f*, whereby the plate can be handled. The latter has connected to one side of its upper part a lead rod *g*, as indicated in Fig. 5, which serves to establish the connections for communicating current. The accumulator-plate is completed by a number of upper and lower cross-pieces *i j*, of wood, ebonite, or other insulating material. Wooden strips *k k* are applied to the sides, and pieces of india-rubber placed over the strips of wood *k* and over the cross-pieces *i j* bind the whole of the plate together and also serve to separate the adjacent plates. The plate thus formed is a positive plate. A negative plate is constructed in the same manner, with the difference that there are no wood strips *k k*. The connecting-rods of the positive plates are always on the same side. Those of the negative plates are all on the opposite side. In Fig. 10 the middle plate is a negative plate, and on each side are two positive plates, the two end plates being also negative plates.

We would observe that contrary to the arrangements usually adopted this accumulator-plate has no metallic frame.

By reason of the aforesaid construction we produce a plate in which the openings formed between the strips are each capable of contracting and expanding in two dimensions—*i. e.*, in the plane of the plate—conformably to changes in dimension of the active material contained in them. The active material adheres firmly to the surface of the corrugated strip and in expanding laterally extends or opens said strip and in contracting in the opposite direction closes the corrugations. The corrugations are sufficiently small to be filled by active material produced by corrosion only. The expansion and contraction of the corrugated strip inwardly and outwardly provides for change in one dimension, while the separation and approach of the several strips provides for simultaneous change in the other dimension. Therefore the active material despite changes in bulk due to the operation of the cell is always retained in the openings, which adjust themselves to it. The elastic bands serve to hold the strips together in yielding contact, so that they are free to separate as the active material increases in bulk, while when the bulk of said material decreases said bands operate to move said strips into closer proximity. It will also be observed that the strips are in all cases flexible and not rigid, while the central conductor, which serves to lead in and out the current, is rigid, and so acts both as a conductor and as a strengthening-rib. Attention is also called to the lead strips *c*, which cover the joints between the strips *a b* on their outer sides. Where the strips *a b* are simply connected together at one end and unprovided with said strips *c*, the metal at the joints between the strips is promptly attacked, and the strips are apt to sink or even fall away from their central support. The strips *c* serve as guards to prevent the electrolyte directly reaching the edges of said joints, while at the same time they serve to stiffen and strengthen the plate.

The non-metallic frame formed by the bars *i j*, wood strips *k k*, and elastic bands prevents the plate from getting out of shape. The upper cross-bar *i* passes through a loop or eye formed in the stem *f* and also through a second metallic loop, which is shown in Fig. 1 surrounding both said bar and the bent lead rod or terminal *g''*.

Among the special constructive features of advantage are the means for detachably securing one of the bars of the non-metallic frame to the leading in and out conductor, the conductor formed as a rigid structure of parallel bars connected by transverse pieces, the construction of the handle for lifting in and out said plate, and the composite flexible strip. (Illustrated in Fig. 4.)

We claim—

1. An electric accumulator-plate comprising a central conducting-core, and strips of thin lead alternately flat and corrugated, attached at one end to each side of the core and free at their other end.

2. The combination with an accumulator-plate having a central conducting-core, and strips of thin lead alternately flat and corrugated, attached at one end to each side of the core and free at their other end, and a strengthening-frame comprising upper and lower cross-pieces of insulating material and india-rubber ligatures binding the whole together but allowing a free lateral expansion of the thin lead strips.

3. An electric accumulator-plate having openings for active material; each of said openings being constructed to contract and expand in two dimensions by and conformably to corresponding changes in dimension of the active material contained therein.

4. In an electric accumulator-plate, a central conductor and two series of strips of thin metal electrically connected thereto and disposed on opposite sides thereof; the said strips being constructed and supported so that the movement of their outer extremities due to contraction and expansion may be universal in the plane of said plate.

5. In an electric accumulator-plate, a central conductor and two series of strips of thin metal electrically connected thereto and disposed on opposite sides thereof; the said strips being constructed and supported so that the movement of their outer extremities due to contraction and expansion may be universal in the plane of said plate, and means for elastically retaining the strips of each series in relative proximity.

6. An electric accumulator-plate having a central conductor and two series of strips of thin flexible metal respectively disposed on opposite sides thereof, each of said strips being attached at one end to said conductor and unattached at the other end.

7. An electric accumulator-plate having a central conductor of rigid metal and two series of superposed strips of thin flexible lead respectively disposed on opposite sides thereof—each of said strips being attached at one end to said conductor and unattached at the other end.

8. In an electric accumulator-plate, two series of superposed thin flexible metallic strips, the strips of each series being united at one end and disposed with the united ends of the strips of one series facing the united ends of the strips of the other series and a bar of conducting material connected to the united ends of both series of strips and interposed between them.

9. In an electric accumulator-plate having a series of superposed thin flexible metallic strips united at one end and guard-strips of metal extending transversely across said strips, disposed on opposite sides thereof and covering the junctions of said strips.

10. In an electric accumulator-plate having a rigid central conductor, a series of flexible metallic strips united at one end to said conductor and guard-strips of metal extending transversely across said strips, disposed on opposite sides thereof and covering the junctions between said strips and said conductor.

11. In an electric accumulator-plate a central conductor, two series of thin metal strips electrically connected thereto, disposed on opposite sides thereof and constructed and supported so that the movement of their outer extremities due to contraction and expansion may be universal in the plane of the plate and a strengthening-frame of non-conducting material secured to and surrounding said plate.

12. In an electric accumulator-plate, a central conductor, two series of thin metal strips electrically connected thereto, disposed on opposite sides thereof and constructed and supported so that the movement of their outer extremities due to contraction and expansion may be universal in the plane of the plate, and an elastic strengthening-frame of non-conducting material secured to and surrounding said plate and having its lateral members extending parallel to said conductor.

13. In combination with an electric accumulator-plate having a rigid central conductor and two series of thin flexible lead strips attached to opposite sides thereof, a bar of insulating material detachably secured on and transversely to said conductor, a loose parallel bar of insulating material and elastic bands inclosing said plate and connecting said bars.

14. In an electric accumulator-plate, having a rigid central conductor and thin flexible superposed strips of metal extending from opposite sides thereof, parallel metallic loops disposed at one end of said plate, a bar of insulating material passing through said loops, a bar of insulating material in contact with the opposite end of said plate and elastic bands connecting said bars.

15. In combination with an accumulator-plate having a compound strengthening-rib comprising two united longitudinal bars and thin lead strips extending laterally from each of said bars, a solid stem connected to both of said bars and extending upward to form a handle for said plate.

16. In combination with an accumulator-plate having a compound strengthening-rib comprising two united longitudinal bars and thin lead strips extending laterally from each of said bars, a solid stem connected to both of said bars and extending upward to form a handle for said plate and provided with a transverse opening, and a frame of insulating material surrounding said plate and having one of its members received in said opening.

17. In an accumulator-plate a compound strengthening-rib comprising two united longitudinal bars and thin lead strips extending laterally from each of said bars.

18. In an electric accumulator-plate, a rigid leading in and out conductor forming part of said plate and consisting of a plurality of parallel separated metallic bars united by a plurality of separated transverse metallic connecting-pieces.

19. In an electric accumulator-plate a rigid leading in and out conductor forming part of said plate and consisting of a plurality of parallel separated metallic bars united by a plurality of separated transverse metallic connecting-pieces in combination with two series of thin flexible superposed metallic strips respectively projecting from opposite sides of said conductor.

20. In an accumulator-plate a composite flexible strip of thin metal forming part of the active element and composed of a plurality of individual strips superposed and united.

In witness whereof we have hereunto signed our names in the presence of two subscribing witnesses.

CHAIMSONOVITZ PROSPER ELIESON.
VLADIMIR DE BOBINSKY.

Witnesses as to C. P. Elieson:
CHARLES F. GUYON,
JOSEPH L. STICKNEY.

Witnesses as to Vladimir de Bobinsky:
WILLIAM H. MUST,
J. N. BRAUN.